United States Patent [19]

Jackson et al.

[11] Patent Number: 4,884,820
[45] Date of Patent: Dec. 5, 1989

[54] WEAR RESISTANT, ABRASIVE LASER-ENGRAVED CERAMIC OR METALLIC CARBIDE SURFACES FOR ROTARY LABYRINTH SEAL MEMBERS

[75] Inventors: John E. Jackson, Brownsburg, Ind.; Norman L. Balmer, Ridgefield, Conn.

[73] Assignee: Union Carbide Corporation, Danbury, Conn.

[21] Appl. No.: 51,931

[22] Filed: May 19, 1987

[51] Int. Cl.$^4$ .................. F01D 5/14; F04D 29/08; F16J 15/453

[52] U.S. Cl. ............................. 277/53; 277/235 R; 277/235 A; 277/DIG. 6; 415/173.4; 415/173.5; 415/174.4; 415/174.5; 416/241 R; 416/241 B

[58] Field of Search ............... 277/53, 96, 96.1, 96.2, 277/235 R, 235 A, 236, DIG. 6; 415/170 R, 170 A, 172 R, 172 A, 173 R, 173 A, 174, 212 R, 212 A, 173.4, 174.4, 173.5, 174.5; 416/241 R, 241 B

[56] References Cited

U.S. PATENT DOCUMENTS

| | | | |
|---|---|---|---|
| 3,068,016 | 12/1962 | Dega | 277/96 |
| 3,339,933 | 9/1967 | Foster | 277/53 |
| 3,481,715 | 12/1969 | Whalen et al. | |
| 3,519,282 | 7/1970 | Davis | 277/230 |
| 3,537,713 | 11/1970 | Matthews et al. | 277/55 |
| 3,758,233 | 9/1973 | Cross et al. | 415/212 R |
| 3,817,719 | 6/1974 | Schilke et al. | |
| 3,843,278 | 10/1974 | Torell | 415/174 |
| 3,918,925 | 11/1975 | McComas | |
| 3,964,877 | 6/1976 | Bessen et al. | |
| 3,975,165 | 8/1976 | Elbert et al. | |
| 4,148,494 | 4/1979 | Zelaby et al. | 277/53 |
| 4,238,170 | 12/1980 | Robldeau et al. | 415/172 A |
| 4,239,452 | 12/1980 | Roberts, Jr. | 415/172 A |
| 4,377,371 | 3/1983 | Wisander et al. | 415/174 |
| 4,540,336 | 9/1985 | Cawley | 415/174 |

FOREIGN PATENT DOCUMENTS

| | | |
|---|---|---|
| 853314 | 11/1960 | United Kingdom . |
| 1008526 | 10/1965 | United Kingdom . |
| 2029308 | 8/1978 | United Kingdom . |
| 2049102 | 12/1980 | United Kingdom . |
| 2139114 | 11/1984 | United Kingdom . |

OTHER PUBLICATIONS

Cahiers D'Informations Techniques De La Revue De Metallurgie, vol. 80, No. 5, May 1983, pp. 393–401, Paris, Fr; J. Crahay et al.: "Gravure de la Rugosite des Cylindres de Laminoir Par Impolsions Laser."

UCARLOX Laser Engraved Ceramic Anilox Rolls by Union Carbide 1985.

I. E. Sumner and D. Ruckle, "Development of Improved-Durability Plasma Sprayed Ceramic Coatings for Gas Turbine Engines", AIAA/SAE/ASME 16th Joint Propulsion Conference, AIAA-80-1193, 7/2/80.

*Primary Examiner*—Allan N. Shoap
*Attorney, Agent, or Firm*—C. F. O'Brien

[57] ABSTRACT

A rotary gas seal in which a first member, e.g., a tip, cooperates with a second member to inhibit gas flow therebetween, the improvement wherein, the tip is provided with a ceramic or metallic coating bonded thereto, the surface of the coating having a plurality of laser-formed depressions and providing a wear-resistant, cutting surface capable of cutting into the second member. Also, a turbine or compressor blade having a tip surface adapted to cooperate with a sealing surface to form a seal between the blade and the sealing surface and a ceramic or metallic carbide coating bonded to said tip surface, the coating having a plurality of laser-formed depressions and providing a wear-resistant, cutting surface capable of cutting into the sealing surface.

23 Claims, 4 Drawing Sheets

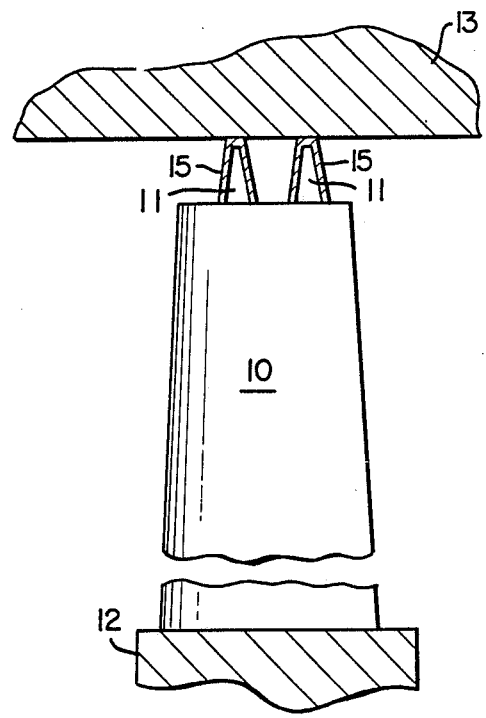
F I G. 1
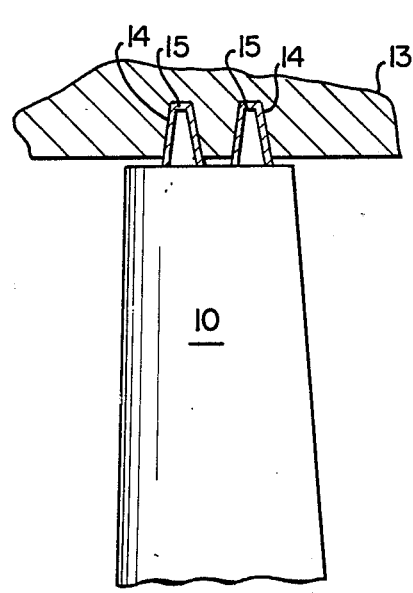
F I G. 2
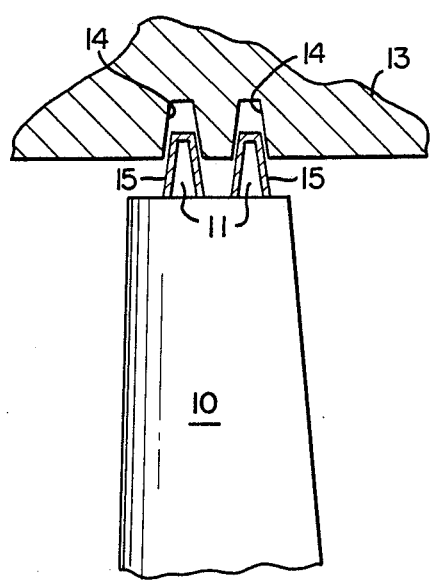
F I G. 3
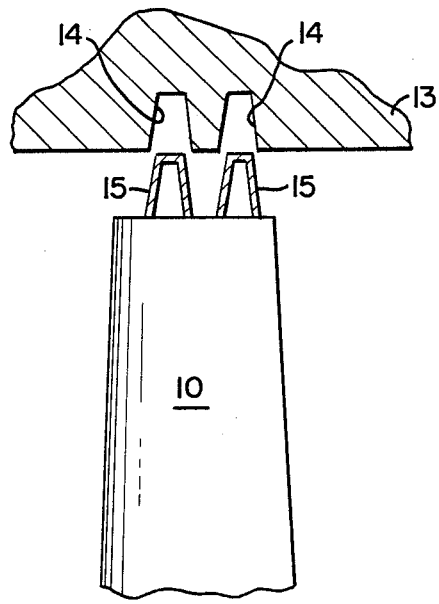
F I G. 4

WEAR RESISTANT, ABRASIVE LASER-ENGRAVED CERAMIC OR METALLIC CARBIDE SURFACES FOR ROTARY LABYRINTH SEAL MEMBERS

BACKGROUND OF THE INVENTION

1. Field of the Invention

This invention relates to gas seals between stationary and rotating members, such as rotary seals in gas turbine engines. More particularly, this invention relates to blade tips or labyrinth type gas seals, such as knife edges, for gas turbine engines.

2. Prior Art

A variety of rotary seals are used in gas turbine engines. Such rotary seals are generally of the type including rotating members cooperating across a narrow gap with another member which is relatively stationary. Such seals are used, in some cases, between stationary members and a rotating shaft or drum for the purpose of maintaining different pressures in chambers on each side of the seal. For example, in one type of gas turbine engine, a plurality of rows of rotor blades extend radially outward from a rotor shaft across a flow path for the working medium gases. Collaterally, a plurality of rows of stator vanes extend radially inwardly across the flow path from a stator case or shroud. In some types, the stator vanes are cantilevered inwardly from the stator case. The vanes are positioned to direct the working gases toward or away from the adjacent rotor blades. A stator has a sealing surface circumscribing the tips of blades in each row of blades and, in the cantilever stator vane types, the rotor is provided with a sealing surface circumscribing the tips of the stator vanes in each stator vane row.

As the clearance between the tips of the blades or vanes in each row and the corresponding sealing surface is increased, substantial amounts of working medium gas escape circumferentially over the tips of the blades and/or stators, reducing the aerodynamic efficiency. Furthermore, when the clearance is increased, additional amounts of working medium gases leak axially over the tips from the downstream end to the upstream end of the blades or rotors. Therefore it is desirable to keep the clearance to a minimum. However, it is also necessary to accommodate various dimensional changes which occur during initial startup, thermal excursions, high G turns, etc. Generally, there is some wear-in of the parts under these conditions, particularly during engine startup.

It is known that the more desirable condition is for the tips or knife edges to cut grooves into the corresponding sealing surface rather than for the tips or knife edges to sustain wear. U.S. Pat. Nos. 4,238,170 and 4,239,452 provide the sealing surface of the stator or shroud with interior circumferential grooves circumscribing the tips of the blades, but this arrangement presents alignment difficulties while failing to accommodate thermally-induced axial displacement of the blades relative to the stator or shroud.

A variety of rotary seal arrangements have been disclosed in the literature in which rotating members generate, cut or abrade a path in a softer, e.g., abradable, cooperating member such as filled honeycomb, porous metal, friable ceramic or the like. In some of these arrangements, it has been found that inadequate sealing or seizing of the cooperating members can result. In other such arrangements, local "hot-spots" and burning of non-abrading members can result. Examples of seals utilizing an abradable member are disclosed in U.S. Pat. Nos. 3,068,016; 3,481,715; 3,519,282; 3,817,719; 3,843,278; 3,918,925; 3,964,877; 3,975,165; 4,377,371 and 4,540,336. The abradable seal is adapted to flake off or abrade, when there is a thermal transient or shock loading causing the blade tip to strike the seal. U.S. Pat. No. 4,377,371 points out that certain materials used as abradable seals are vulnerable to large scale spalling propagated by the presence of cracks in the seal surface and discloses the glazing of the seal surface by the use of a laser beam to produce a fine micro-crack network in the seal surface. In a paper "Development of Improved-Durability Plasma Sprayed Ceramic Coatings for Gas Turbine Engines", presented by I. E. Sumner and D. Ruckle at the AIAA/SAE/ASME 16th Joint Propulsion Conference, AIAA-80-1193, segmented laser scanned coatings were reported to perform poorly.

British Patent Nos. 853314 and 1008526 disclose turbine or compressor blades formed with ribs on their tips for providing a seal with a rotor or stator shroud, the ribs or cooperating seal surface being removable when worn out. U.S. Pat. No. 4,148,494 discloses a gas turbine blade or vane having an abrasive tip comprising a electrodeposited matrix of nickel or an alloy containing nickel in which are entrapped abrasive particles, e.g., Borazon particles, protruding from the tip. Abrasive tips of the type described in this patent are difficult to produce and are extremely expensive. U.S. Pat. No. 3,339,933 discloses blade teeth coated with bonded alumina which expand into cooperating honeycomb members to form a seal. U.S. Pat. No. 3,537,713 discloses a rotating sleeve having inwardly projecting teeth coated with a hard protective material, such as a molybdenium or nickel aluminide, which displaces a rub-resistant material on a stationary cooperating member to form alternate ridges and grooves.

None of the above-mentioned prior art references disclose or suggest teeth, ribs or knife edges coated with a wear-resistant ceramic or metal carbide coating having laser-formed depressions for cutting into a sealing surface in forming a labyrinth seal.

SUMMARY OF THE INVENTION

According to the present invention, the tips of turbine blades, compressor blades, fan blades, impellers, stator vanes, diffusers, shrouds, spoilers, spacers, and the like designed to cooperate with a sealing surface are provided with a wear-resistant ceramic or metallic carbide coating having laser-formed depressions providing a laser-engraved, wear-resistant, cutting surface capable of cutting into the sealing surface. In one specific embodiment of the invention the tip is provided with one or more knife edges, teeth or ribs which are coated with the wear resistant, laser-engraved cutting surface of this invention and are designed to cut into the sealing surface to provide a labyrinth seal. The laser-engraved surfaces produced by this invention are wear- and corrosion-resistant and are capable of cutting into the cooperating sealing surface with minimal heat generation thus minimizing the risk of thermal warping and degeneration of physical properties of the member to which it is applied or to the cooperating sealing member.

The cutting capability of the laser-engraved surface is believed to be due to the elevated land areas which act as a collection of cutting edges. Further, the depressions between the land areas are believed to enhance cutting ability by receiving the fine cutting debris during cutting and releasing it when the turbine cools down and the tip retracts from the sealing surface.

Depending on how the laser is operated, the land areas can either be part of the original coating material or they can be built up above the original surface by material being melted, thrown up and recast around the edges of the depression. Recast material typically has a microstructure and properties which differ from that of the bulk coating. Reference is made hereinafter to photomicrographs which illustrate the metallurgical and/or topographical changes wrought on the surface of ceramic or metallic carbide coating in this invention where, for example, the appearance of a coated surface subsequent to laser treatment can be seen.

No prior art has been found to disclose the concept of the present invention which involves first bonding a ceramic or metallic carbide coating to the contact surface of a member designed to contact and cut into a cooperating member in the formation of a labyrinth seal and then laser-engraving a plurality of laser-formed depressions and resultant recast material around each depression to provide a uniform cutting surface on the contact surface.

BRIEF DESCRIPTION OF THE DRAWINGS

FIG. 1 is a fragmentary, sectional view showing a turbine blade having knife edges in contact with a sealing surface diagrammatically illustrating the relative positions under cold conditions for a new or rebuilt and unrun engine.

FIG. 2 is a fragmentary, diagrammatic, sectional view illustrating the relative positions of the blade tip with its knife edges and the sealing surface under contact conditions as the turbine is accelerated toward the design speed.

FIG. 3 is a fragmentary, sectional, diagrammatic view illustrating the relative positions of the turbine blade with its knife edge in relation to the sealing surface under design operating conditions.

FIG. 4 is a fragmentary, sectional view showing the turbine blade shown in FIGS. 1-3 diagrammatically illustrating the relative positions of the knife edges and sealing surface under cold conditions for an engine which has been run one or more times.

FIG. 4b is a plan view taken along line b—b of FIG. 4a.

DETAILED DESCRIPTION OF THE INVENTION

Figure 4A:
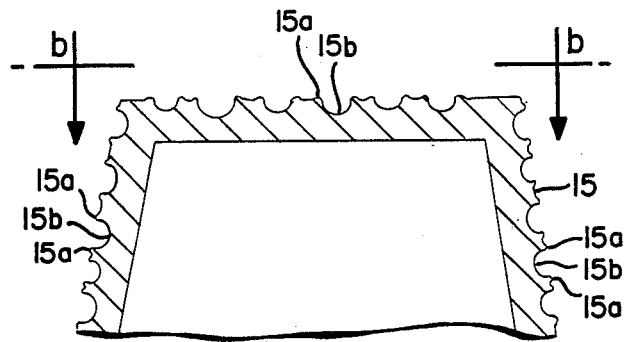
FIG. 4a is a greatly enlarged cross-section of the tip of blade 15 shown in FIG. 4.

FIG. 1 illustrates a turbine blade 10 having knife edges 11 on its tip. The turbine blade 10 is mounted on a rotor 12 and extends towards a stator 13. In the cold condition for a new, or rebuilt, and unrun engine as shown in FIG. 1, the knife edges 11 just clear the stator 13 whereas, as shown in FIG. 2, as the turbine accelerates to design speed the knife edges contact and cut into the stator 13. At design speed, as shown in FIG. 3, the knife edges recede somewhat from the grooves 14 which have been cut into the stator 13. FIG. 4 illustrates the relation of the knife edges 11 to the sealing surface 13 in a cold engine that has been run one or more times.

Figure 4B:
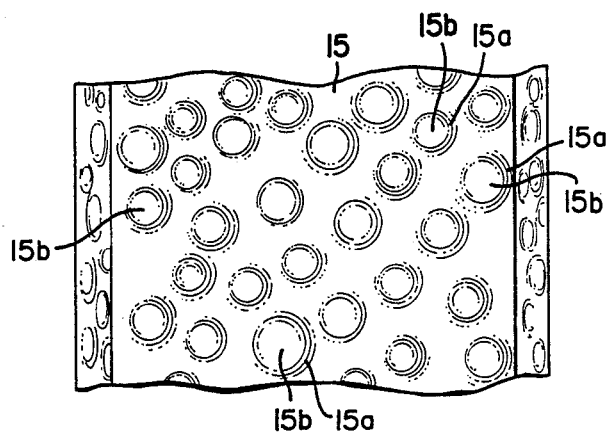

FIG. 4a illustrates the tip of blade 15 greatly enlarged so as to show land areas 15a defining depressions 15b formed by the laser engraving on the surface of blade 15. The land area 15a provides a cutting edge while as stated above the depressions defined by the land area are believed to enhance the cutting ability since fine cutting debris could be projected into the depressions and then the cutting debris could be released when the turbine cools down and the tip is extracted from the sealing surface. FIG. 4b shows the plan view taken along line b—b of FIG. 4a and illustrates the various land areas 15a which define the depressions 15b.

Figure 6:
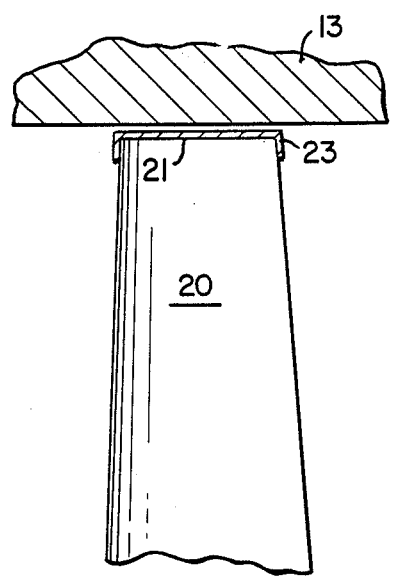
FIG. 6 is a fragmentary, sectional view of the turbine blade given in FIG. 5 diagrammatically illustrating the relative positions of the blade tip and the sealing surface under contact conditions as the turbine is accelerated toward design speed.
Figure 6:
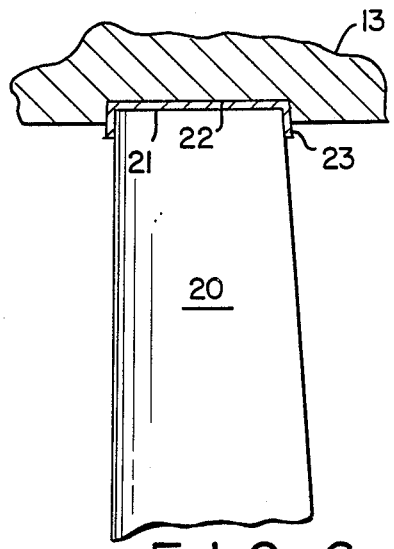
Figure 5:
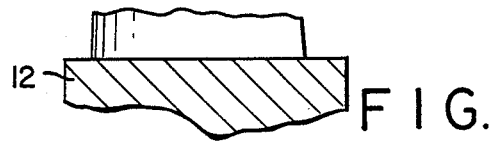
FIG. 5 is a fragmentary, sectional view showing a turbine blade having a tip in contact with a sealing surface diagrammatically illustrating the relative positions under cold conditions for a new or rebuilt and unrun engine.
Figure 7:
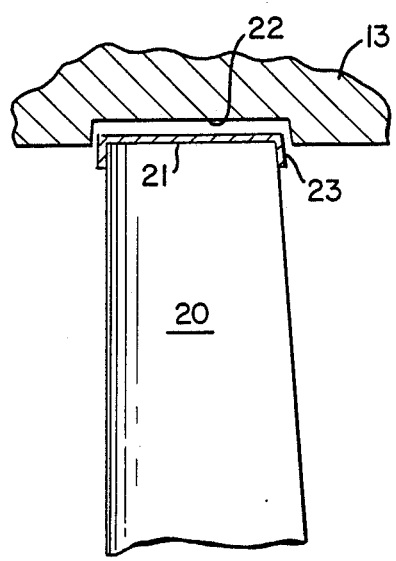
FIG. 7 is a fragmentary, sectional view showing the turbine blade of FIG. 5 diagrammatically illustrating the relative positions of the turbine blade with its tip in relation to the sealing surface under design operating conditions.
Figure 8:
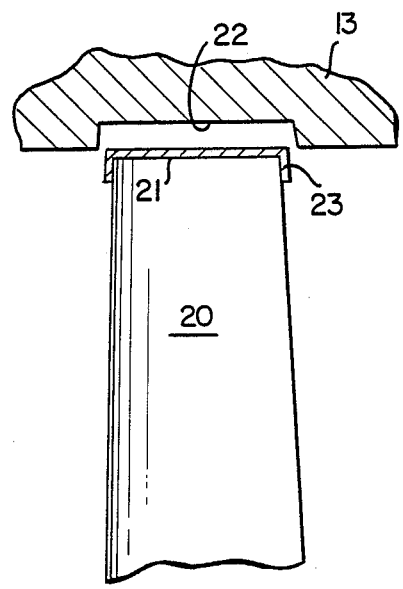
FIG. 8 is a fragmentary, sectional view showing the turbine blade of FIG. 5 diagrammatically illustrating the relative positions of the blade tip and sealing surface under cold conditions for a turbine which has been run one or more times.

FIG. 5 illustrates a turbine blade 20 having a tip 21 wherein the turbine blade is mounted on a rotor 12 and extends towards stator 13. In the cold condition for a new, or rebuilt, and rerun engine as shown in FIG. 5, the tip 21 just clears the stator whereas, as shown in FIG. 6, as the turbine accelerates to design speed the tip 21 contacts and cuts into the stator 13. At design speed, as shown in FIG. 7, the tip recedes somewhat from groove 22 which have been cut into the stator 13 by the tip 21. FIG. 8 illustrates the relation of the tip 21 to the sealing surface 13 in a cold engine that has been run one or more times.

The surface of the knife edges 11 and the tip 21 are provided with ceramic or metallic carbide coatings 15 and 23, respectively, which are applied in the manner described hereinafter and laser-engraved to produce a pattern of laser formed depressions as described hereinafter. Any suitable ceramic coating or metallic carbide coating may be applied to the knife edge 11 or tip 21. For example, tungsten carbide and mixtures and/or alloys of tungsten carbide with cobalt, nickel, chromium, iron and mixtures of such metals can be employed. In addition, titanium carbide, tungsten-titanium carbide and chromium carbide are also useful. The above-mentioned carbides can be used separately or mixed or alloyed with cobalt, chromium, tungsten, nickel, iron or other suitable metals. The ceramic coatings include alumina, mixtures of alumina with titania, chromia, mixtures of chromia and alumina, zirconia mixed with magnesia and the like. Specifically, the following coating compositions made and sold by Union Carbide Corporation can be used to provide coatings 15 and 23:

| LC1B | a coating containing 65 wt. % chromium carbide (92 wt. % chromium, 8 wt. % carbon) and 35 wt. % nichrome (80 wt. % nickel and 20 wt. % chromium) |
|---|---|
| LCO-17 | a coating containing 10 wt. % alumina and 90 wt. % of a cobalt alloy containing 54 wt. % Co. (cobalt) 25 wt. % Cr. (chromium) 10 wt. % Ta (Tantalum) 7.5 wt. % Al. (aluminum) 0.8 wt. % Y (yhrium) 0.7 wt. % Si (silicon) and 2 wt. % C (carbon) |
| LW1N-40 | a coating containing 82 wt. % W, 14 wt. % Co, and 4 wt. % C. |
| UCAR 24-K | a coating of titanium nitride. |
| LZ-4B | a mixture containing zirconia stabilized with magnesia containing 8 wt. % magnesia and 92 wt. % zirconia. |

The ceramic or metallic carbide coatings are applied to the metal surface of the knife edge 11 and tip 21 by a thermal spray process such as the detonation gun process or the plasma coating process. The detonation gun process is well known and fully described in U.S. Pat. Nos. 2,714,536, 4,173,685 and 4,519,840, the disclosures of which are incorporated herein by reference, and involves feeding oxygen, acetylene and nitrogen into a gun barrel along with a charge of the material being coated, e.g., ceramic or metallic carbide or metallic powder. The gas mixture is then ignited and the resulting detonation wave accelerates the powder to about 2400 ft./second while heating it close to, or above, its melting point. The maximum free-burning temperature of oxygen-acetylene mixtures under constant pressure conditions occurs with about 45% acetylene and is about 3140° C. However, under conditions such as a detonation, where combustion occurs essentially at constant volume, the temperature probably exceeds 4200° C. so that most materials can be melted by the process.

The gun barrel is aimed at the substrate and the powder at or near or above its melting point is deposited on the substrate. After each firing, the gun barrel is purged with nitrogen. This cycle is repeated about 4 to 8 times a second and each pulse of powder results in the deposition of a circle of coating of about 25 mm. in diameter and a few microns thick. The total coating is produced by many overlapping circles of coatings, each of which is composed of many overlapping, thin, lenticular particles or splats corresponding to the individual powder particles. The overlapping circles are closely controlled to produce a relatively smooth coating.

The plasma technique for coating the knife edges is conventionally practiced and is described in U.S. Pat. Nos. 3,016,447, 3,914,573, 3,958,097, 4,173,685 and 4,519,840, the disclosures of all of which are incorporated herein by reference. In the plasma coating technique, a plasma torch having a copper anode and tungsten cathode is usually used. A gas such as argon or nitrogen or a mixture of these with hydrogen or helium is caused to flow around the cathode and through the anode which serves as a constricting nozzle. A direct current arc, usually initiated with a high frequency discharge, is maintained between the electrodes. The arc current and voltage used vary with the anode/cathode design, gas flow and gas composition. The power used varies from about 5 to 80 killowatts depending on the type of torch and the operating parameters.

A gas plasma is generated by the arc and contains free electrons, ionized atoms and some neutral atoms and unassociated diatomic molecules when nitrogen or hydrogen are used. Plasma gas velocities with most conventional torches are subsonic but supersonic velocities can be generated using converging or diverging nozzles with critical exit angles. The temperature of the plasma may exceed 50,000° F. A ceramic coating powder or a metallic carbide coating powder is introduced into the plasma stream. The coating powder melts in the plasma and is caused to impinge upon the substrate. The plasma process of coating utilizes much higher temperatures than the detonation gun (or D-gun) process and also is a continuous process whereas the D-gun process is intermittent and non-continuous.

The thickness of the coating 15 or 23 applied by either the plasma process or D-gun process can range from 0.5 to 100 mils, preferably 2 to 15 mils.

Following deposition of the coating on the knife edge or other cutting surface, the resulting ceramic or metallic carbide coating bonded to the surface of the knife edge may be ground with a diamond grinding wheel to provide a more even surface for application of the laser-engraved patterns hereinafter described. Other than for dimensional control of the coated surface, a grinding step would not usually be required for the parts described herein.

The ceramic or metallic carbide coating is laser-engraved using a pulsed laser of a gas type such as $CO_2$ or solid state type such as YAG in order to produce a suitable pattern and depth of laser-formed depressions and land areas on the coating surface. The depths of the laser-formed depressions, as measured from the bottom of the depression to the top of the land surrounding it, can vary from a few microns or less to as much as 120 or 140 microns or more, e.g. 2 to 200 microns, preferably 20 to 100 microns. The average diameter can vary from 1.0 to 12 mils, preferably from 2.5 to 10 mils. The average diameter and depth of each depression is controlled by the energy content and pulse length of the laser pulse. The spacing between laser-formed depressions is controlled by the firing rate of the laser and the amount of relative motion between the laser beam and the coated surface. The number of laser-formed depressions per lineal inch extends typically from 80 to 800, preferably 100 to 400.

A wide variety of laser machines are available for forming depressions in the ceramic or metallic carbide coating. In general, lasers are available that provide an extremely large range of joules per pulse, pulse times and operating frequencies. Thus, there is no problem in choosing an appropriate laser and operating conditions to produce the surface topography herein described.

Figure 10:
FIG. 10 is a SEM micrograph at 560× magnification (Indium Replica) of an individual cell or depression in the laser-engraved knife edge.
Figure 9:
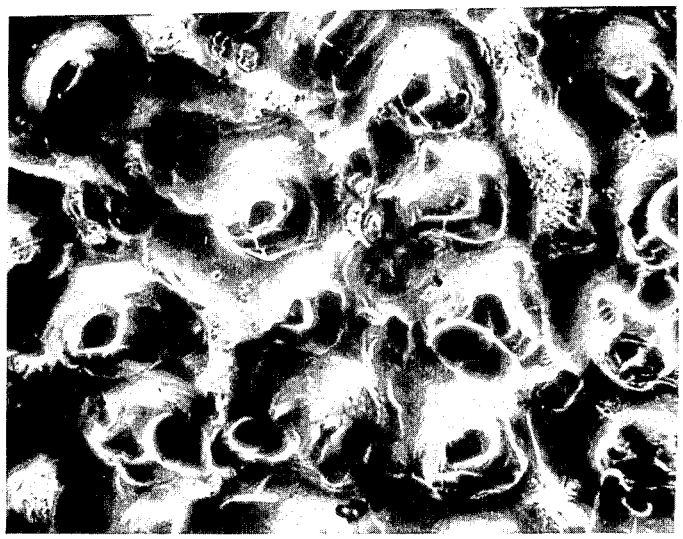
FIG. 9 is a SEM photomicrograph at 120× magnification (Indium Replica) of a laser-engraved knife edge produced pursuant to the present invention showing the pattern of the cells depressions formed by the laser.

As best seen in FIGS. 9 and 10, the surface of the ceramic or metallic carbide coating after laser-engraving comprises a series of land areas and depressions in the form of microcavities or cells formed by (a) vaporization of some material and in some cases (b) the melting, moving and recasting of additional material when the coating is hit by the laser pulse. Where recast material is present it has been found to differ considerably from the original coating. In general, it is denser and less porous than the original material, and may have a different atomic structure, e.g., alumina-titania mixtures, which as coated appear in separate phases but on recasting by laser treatment form a single phase material. It is believed that the land area, whether it be the original coating material or recast material, formed in ridges around each depression provides a roughened surface that presents minute cutting edges which cut into the abradable material or honeycomb structure bonded to the surface of stator 13. The thickness of the recast material as measured from the surface of the virgin coating can be 10% to 40% of the total depression depth, preferably 20% to 30%.

The depressions occupy from 10% to 90% of the surface area and preferably from 50% to 90%. The corresponding preferred land area is 10% to 50%.

It can also be observed from FIG. 9 that the depressions are provided in a random pattern in the ceramic or metallic carbide coating. THe average center to center distance between depressions is substantially constant.

The following illustrative Example is presented. The following abbreviations and designations are used in the Example and elsewhere herein:

| | |
|---|---|
| D-Gun Coating Method | a detonation gun method of applying a ceramic or metallic carbide coating to a substrate in which the ceramic or metallic carbide powder is charged to a gun barrel with nitrogen, oxygen and acetylene which is detonated to produce a temperature of about 6000° F. which melts the ceramic or metallic carbide powder and propels it against the substrate. |
| Plasma Coating Method | a technique for continuously applying a ceramic or metallic carbide coating to a substrate by injecting the ceramic or metallic carbide powder into a plasma of ionized gas formed by establishing an electric arc across a stream of inert gas, specifically argon. A ceramic or metallic carbide powder is continuously fed to the plasma which may be operating at a temperature as high as 50,000° F. The powder is heated and accelerated with the expanding gases in the plasma and is directed against the substrate where the powder cools, congeals and bonds to the substrate. |
| Screen Size | average number of depressions per lineal inch. |
| LW1N-40 | a coating containing 82 wt. % W, 14 wt. % Co, and 4 wt. % C. |

EXAMPLE 1

Eight knife edge seal specimens representing the rotary member of a rotary labyrinth seal were prepared for coating by grit-blasting the knife edges with 60 mesh Al$_2$O$_3$ fed at 2.1 pounds per minute under a pressure of 15 psi through a pressure blast unit utilizing a ¼ inch i.d. Al$_2$O$_3$ nozzle aimed at the beveled edge of the knife edge at a 5 inch standoff for a total of about 32 seconds. The grit-blasted surface of the knife edge had a roughness of 105 R$_a$. The knife edge specimens were coated with LW-1N40 by the use of a detonation gun operating with a gas composition of 28% acetylene, 28% oxygen and 44% nitrogen, a gas flow rate of 11 cubic ft. per minute and a powder feed rate of 54 grams per minute to provide a coating thickness of 0.005" to 0.008".

Six of the coated knife edge seal specimens were further processed by laser-engraving on both sides such that the laser beam was perpendicular to the knife edge surface on which it was operating under such conditions as would provide a diameter of the laser formed depressions ranging between 0.010 and 0.006" which is the equivalent of a screen size of 100 to 140, respectively. In addition, the laser-engraving was carried out under such conditions designed to provide a depression depth of 50 to 70 microns. The laser was operated at a power of 59 watts, a pulse duration of 145 microseconds at a frequency of 1000 Hertz. The energy content per pulse was approximately 0.059 Joules. The depressions formed were 50 micrometers deep and had a screen which averaged 130 depressions per lineal inch. Hence, the average diameter of the depressions is 0.0077 inch (1/130). Thus, in this case the depressions occupy approximately 79% of the surface area and the land area occupies the remaining 21%.

After engraving, the knife edges were subjected to macro and micro structural analysis, metallographically and on the scanning electron microscope (SEM), in order to determine the actual depression depth and diameter, the presence or absence of recast material and the overall condition of the engraving. The average depression depth from the virgin coating surface to the bottom of the depression was found to be 45.6 micrometers while the average depth of the depressions from the top of the recast material to the bottom of the depression was found to be 73.6 micrometers. The average thickness of the recast material was measured as 23.8 micrometers. A Zeiss metallograph was used in making the depth and thickness measurements.

FIG. 9 is a photomicrograph of the resulting laser-engraved knife edge specimen of this Example at a magnification of 120× (indium replica). FIG. 9 shows the substantially uniform distribution of laser-formed depressions and the presence of recast material around each depression. In addition, FIG. 9 shows the virgin coating between the individual rows of depressions. FIG. 10 shows the morphology of an individual depression at a magnification of 560× (indium replica) showing recast material around the laser-engraved depression and the virgin coating around the recast material.

The six laser engraved knife edge specimens were tested at ambient temperature conditions. In this test the knife edge is rotated with an edge velocity of 950 ft./sec. and moves into an arcuate sealing surface at a rate of 0.002 " per second thereby cutting a 0.06" groove in the arcuate sealing surface specimen during a thirty second test or a 0.030" groove during a fifteen second test.

What is claimed is:

1. A rotary gas seal comprising a first member, and a second member, in which the first member is adapted to move in relation to the second member and has a tip surface cooperating with a sealing surface of the second member to inhibit gas flow between the tip surface and sealing surface, said tip surface coating with a coating selected from the group consisting of ceramic coatings and metallic carbide coatings; a plurality of substantially circular laser-formed depressions defined by land areas formed in the coated surface of said tip surface and said land areas providing a wear-resistant, roughened cutting area adapted for cutting into the sealing surface of the second member.

2. The rotary gas seal of claim 1 wherein said tip surface is in the form of at least one knife edge extending in the direction of movement of the first member relative to the second member.

3. The rotary gas seal of claim 1 or 2 wherein the thickness of said coating before formation of said laser-formed depression is from about 0.5 to about 100 mils.

4. The rotary gas seal of claim 1 or 2 wherein the thickness of said coating before formation of said laser-formed depressions is from about 2 to about 15 mils.

5. The rotary gas seal of claim 1 or 2 wherein the depth of said laser-formed depressions is in the range between about 2 and about 200 microns.

6. The rotary gas seal of claim 1 or 2 wherein said depressions are formed in a random pattern having substantially uniform spacings between adjacent depressions.

7. The rotary gas seal of claim 1 or 2 wherein said depressions are spaced from about 80 to about 800 depressions per lineal inch.

8. The rotary gas seal of claim 1 or 2 wherein said laser-formed depressions occupy 50 percent to 90 percent of the surface and the land areas between the depressions occupy the remaining 50 percent to 10 percent of the surface.

9. The rotary gas seal of claim 1 or 2 wherein the coating is selected from the group comprising tungsten carbide, titanium carbide, chromium carbide, alumina, titania, chromia, zirconia, magnesia, and titanium nitride.

10. The rotary gas seal of claim 9 wherein the coating additionally comprises at least one member from the group comprising cobalt, nickel, chromium, iron, tantalum, aluminum, ytrium, and silicon.

11. A blade comprising a tip surface adapted to cooperate with a sealing surface moving relative to the tip surface to inhibit gas flow between the sealing surface and the tip surface, said tip surface coated with a coating selected from the group comprising ceramic coatings and metallic carbide coatings; a plurality of substantially circular laser-formed depressions defined by land areas formed in the coated surface of said tip surface and said land areas providing a wear-resistant, roughened cutting area adapted for cutting into the sealing surface.

12. The blade of claim 11 wherein said tip surface is in the form of at least one knife edge extending in the direction of movement of the tip surface relative to the sealing surface.

13. The blade of claim 11 or 12 wherein the coating is a ceramic coating.

14. The blade of claim 11 or 12 wherein the coating is a metallic carbide coating.

15. The blade of claim 11 wherein the thickness of said coating before formation of said laser-formed depressions is from about 0.5 to about 100 mils.

16. The blade of claim 11 wherein the thickness of said coating before formation of said laser-formed depressions is form about 2 to about 15 mils.

17. The blade of claim 11 wherein the depth of said laser-formed depressions is in the range between about 2 and about 200 microns.

18. The blade of claim 11 wherein the depth of said laser-formed depressions is in the range between about 20 and about 100 microns.

19. The blade of claim 11 wherein said depressions are formed in a random pattern having substantially uniform spacings between adjacent depressions.

20. The blade of claim 11 wherein said depressions are spaced between 80 to 800 depressions per lineal inch.

21. The blade of claim 11 wherein said depressions are spaced between 100 to 400 depressions per lineal inch.

22. The blade of claim 11 wherein the coating is selected from the group comprising tungsten carbide, titanium carbide, chromium carbide, alumina, titania, chromia, zirconia, magnesia, and titantium nitride.

23. The blade of claim 22 wherein the coating additionally comprises at least one member from the group comprising cobalt, nickel, chromium, iron, tantalum, aluminum, ytrium, and silicon.

* * * * *

UNITED STATES PATENT AND TRADEMARK OFFICE
CERTIFICATE OF CORRECTION

PATENT NO. : 4,884,820
DATED : December 5, 1989
INVENTOR(S) : John Eric Jackson, Norman Louis Balmer It is certified that error appears in the above-identified patent and that said Letters Patent is hereby corrected as shown below:

Column 5, line 11, the word "(yhrium)" should read "(yttrium)".

Column 9, line 24, the word "ytrium" should read "yttrium".

Column 10, line 12, the word "form" should read "from".

Column 10, line 36, the word "ytrium" should read "yttrium".

Signed and Sealed this

Twenty-second Day of September, 1992

Attest:

DOUGLAS B. COMER

*Attesting Officer*       *Acting Commissioner of Patents and Trademarks*